United States Patent [19]

Darceot

[11] Patent Number: 5,739,603

[45] Date of Patent: Apr. 14, 1998

[54] ELECTRICAL CONNECTING ELEMENT FOR ELECTRIC MOTOR AND ELECTRIC MOTOR EQUIPPED WITH THIS ELEMENT

[75] Inventor: Michel Darceot, Herimoncourt, France

[73] Assignee: Ecia-Equipement et Composants pour l'Industrie Automobile, Audincourt, France

[21] Appl. No.: 707,513

[22] Filed: Sep. 4, 1996

[30] Foreign Application Priority Data

Sep. 4, 1995 [FR] France .................... 95 10350

[51] Int. Cl.⁶ ........................................ H02K 11/00
[52] U.S. Cl. ........................................ 310/71
[58] Field of Search ........................ 310/71, DIG. 6

[56] References Cited

U.S. PATENT DOCUMENTS

| | | | |
|---|---|---|---|
| 4,689,023 | 8/1987 | Strong, III et al. | 310/71 |
| 4,779,330 | 10/1988 | Genco et al. | 310/71 |
| 4,900,968 | 2/1990 | Feigel et al. | 310/71 |
| 5,157,293 | 10/1992 | Escaravage | 310/71 |
| 5,187,858 | 2/1993 | Murakoshi et al. | 310/71 |

FOREIGN PATENT DOCUMENTS

| | | | |
|---|---|---|---|
| 635926 | 1/1995 | European Pat. Off. | |
| 2632790 | 12/1989 | France . | |
| 29504636 | 7/1995 | Germany . | |
| 56-78345 | 6/1981 | Japan | 310/71 |
| 6-46543 | 2/1994 | Japan | 310/71 |
| 6-189496 | 7/1994 | Japan | 310/71 |

*Primary Examiner*—Clayton E. LaBalle
*Attorney, Agent, or Firm*—Sughrue, Mion, Zinn, Macpeak & Seas, PLLC

[57] ABSTRACT

The motor comprises a fixed armature winding (12) equipped with an armature of generally cylindrical shape (16) carrying conducting coils, and an electronic circuit (36) for electrical power supply to and commutation of the coils. The electrical connecting element (40) comprises a conducting ring (42) including a first face equipped with at least two axial spigots (44) for fastening onto the armature, a second face equipped with at least two conducting axial pins (46) for connection with the electronic circuit (36), and at least two conducting peripheral hooks (48) for connecting the coils with the ring (42). This ring is sectionable into electrically isolated sectors.

16 Claims, 8 Drawing Sheets

ELECTRICAL CONNECTING ELEMENT FOR ELECTRIC MOTOR AND ELECTRIC MOTOR EQUIPPED WITH THIS ELEMENT

BACKGROUND OF THE INVENTION

The present invention relates to an electrical connecting element for an electric motor as well as an electric motor equipped with this element.

It applies in particular to electronic-commutation electric motors used particularly in the electric fan units equipping motor vehicles.

Direct-current electric motors equipped with a armature winding supplied with electricity by brush and collector means are already known in the state of the art. This type of motor has been improved by replacing the brush and collector means by an electronic circuit for electrical power supply to and commutation of the armature winding coils.

The ends of the wires of the armature winding coils of an electronic-commutation motor are generally linked to the electronic circuit by welding. The welding operations have to be carried out manually since they are difficult to automate.

SUMMARY OF THE INVENTION

The object of the invention is to facilitate the manufacture of an electronic-commutation electric motor, particularly by making it possible to carry out the operations of connecting the coils of the armature winding to the electronic circuit by automatic means.

To this end, the subject of the invention is an electrical connecting element for an electric motor, this motor comprising an armature winding equipped with an armature carrying conducting coils, and an electronic circuit for electrical power supply to and commutation of the coils, characterized in that it comprises a conducting ring including a first face equipped with at least two axial spigots for fastening the armature, a second face equipped with at least two conducting axial pins for connection with the electronic circuit, and at least two conducting peripheral hooks for connecting the coils with the ring, the conducting ring being sectionable into electrically isolated sectors.

According to other characteristics of this electrical connecting element:

- the fastening spigots, the pins, and the hooks for connection are of the same material as the ring;
- the connecting hooks are formed by curved-over tabs from holes formed in the fastening spigots;
- the element comprises indexing means with complementary axial gap and projection, for the correct angular positioning of the fastening spigots with respect to the armature;
- the element comprises indexing means by irregular angular spacing of the connecting pins for the correct connection of these pins with the electronic circuit.

A further subject of the invention is an electric motor of the type including a fixed armature winding equipped with an armature of generally cylindrical shape carrying conducting coils, and a support carrying an electronic circuit for power supply to and commutation of the coils, characterized in that it is equipped with an electrical connecting element of generally cylindrical shape, coaxial with the armature and comprising a conducting ring including a first face equipped with at least two axial spigots for fastening onto the armature which can be plugged into complementary holes formed in this armature, a second face equipped with at least two axial conducting pins for connecting with the electronic circuit which can be plugged into piercings formed through the support of the circuit, and at least two conducting peripheral hooks for connecting the coils with the ring, this ring being sectioned into electrically isolated sectors.

According to other characteristics of this electric motor:

- the fastening spigots, the pins and the connecting hooks are made of the same material as the ring, the hooks being formed by curved-over tabs of holes formed in the fastening spigots;
- the holes for fastening the spigots are formed in an electrical insulation cheek covering one face of the armature;
- the motor comprises indexing means with complementary axial gap and projection, for correct angular positioning of the fastening spigots with respect to the armature;
- the axial gap and projection are formed in the ring and the insulating cheek;
- the motor comprises indexing means by irregular angular spacing of the connecting pins, for the correct connection of the connecting pins with the electronic circuit, with asymmetric angular spacing of these pins.

The invention will be better understood on reading the description which will follow, given solely by way of example and by referring to the attached drawings in which:

DESCRIPTION OF PREFERRED EMBODIMENTS

Figure 1:
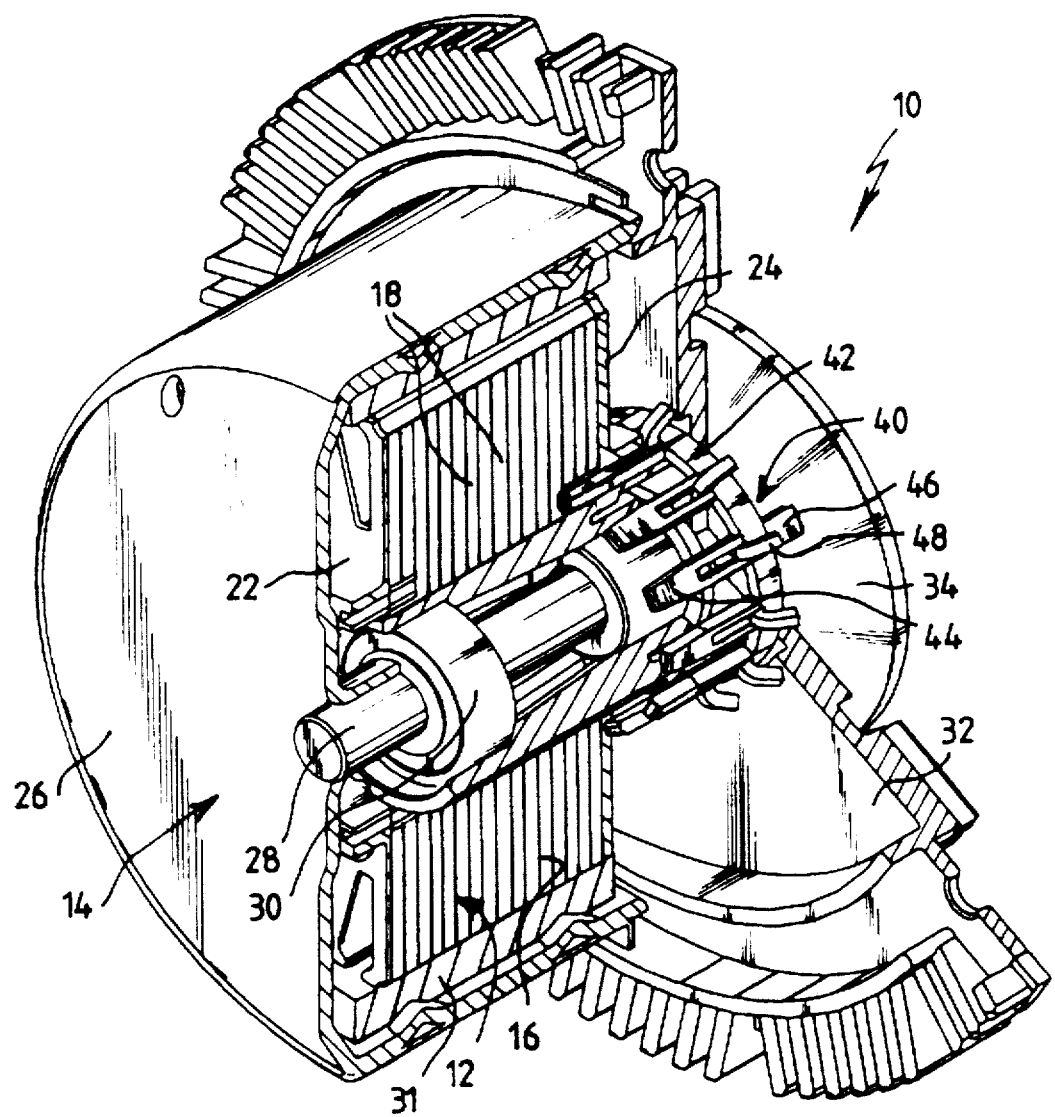
FIG. 1 is a perspective view in axial section of an electric motor according to the invention.

A direct-current electric motor according to the invention, designated by the overall reference 10, has been represented in FIG. 1.

This motor 10 includes a fixed armature winding 12 and a rotary field system 14. For reasons of clarity, the conducting coils of the armature winding 12 have not been represented in FIGS. 1 and 2.

The armature winding is of the three-phase square type and will be described later.

Figure 2:
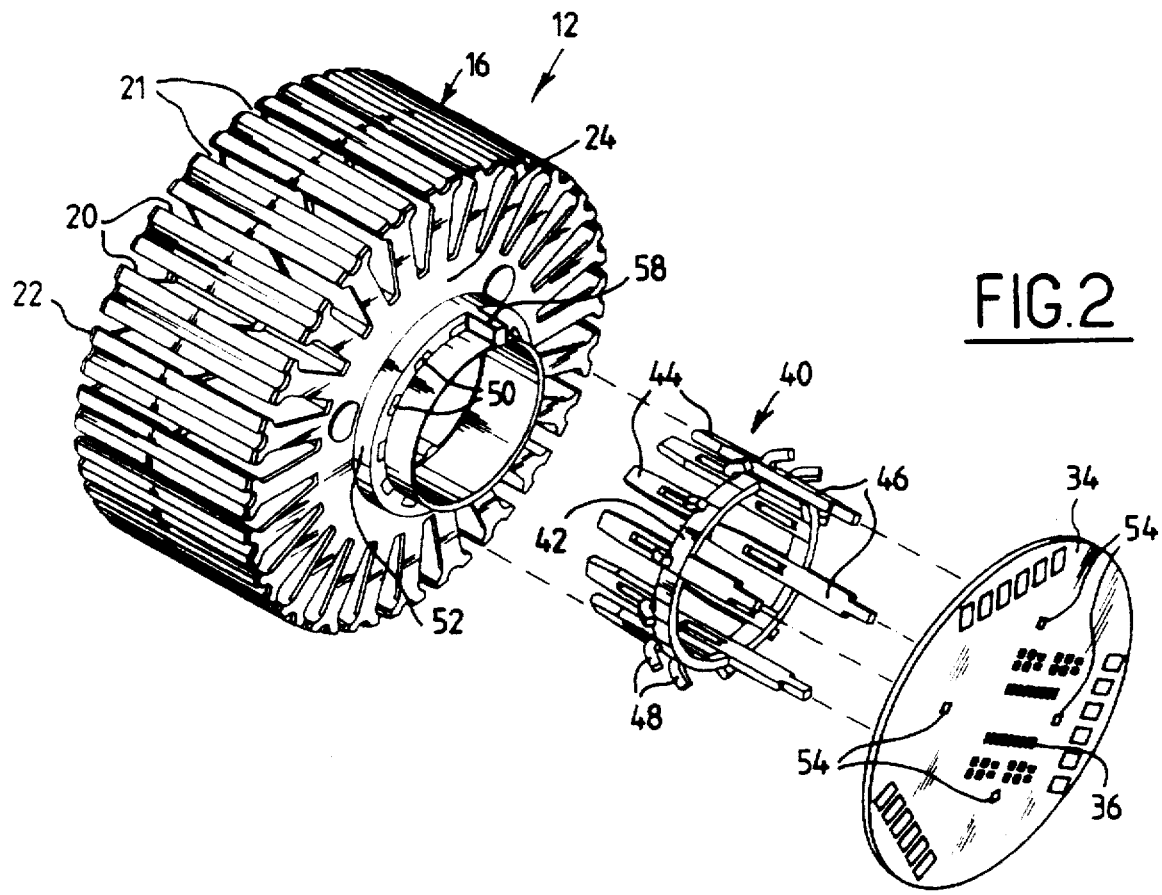
FIG. 2 is an exploded perspective view of certain elements of the motor represented in FIG. 1.

The armature winding 12 includes an armature 16 of generally cylindrical shape comprising, conventionally, a stack of laminations 18 delimiting slots 20 for fixing the coils, which are clearly represented in FIG. 2. The slots 20 are separated by teeth 21.

The armature 16 also includes electrical insulation cheeks 22, 24 covering these faces.

The field system 14 includes a bowl-shaped rotary armature 26 in which the armature winding 12 is housed.

The field system armature 26 is linked in a way which is known per se to a rotary shaft 28 carried by bearing means 30 interposed between this shaft 28 and the armature winding 16.

Permanent magnets 31 are fastened in a way known per se to the inner contour of the field system armature 26.

The open side of the field system armature 26 is closed off by a fixed flange 32 carrying a plate 34 forming a support for an electronic circuit 36 for supplying power to and commutating the coils of the armature winding 12.

Figure 3:
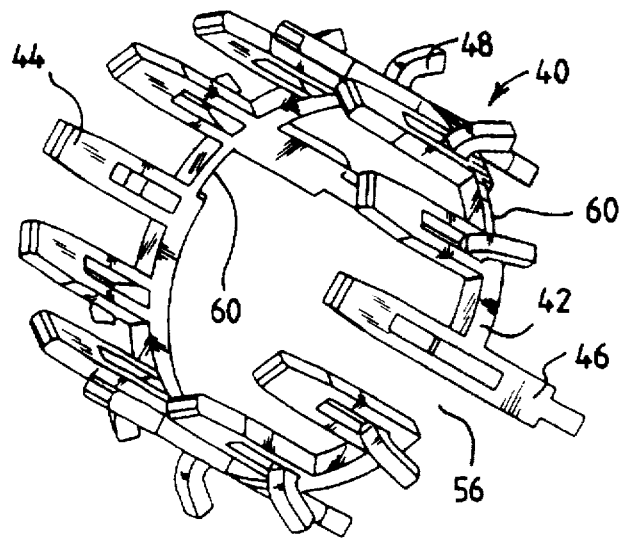
FIG. 3 is a perspective view, on an enlarged scale, of an element for electrical connection of the motor according to the invention.

The electronic circuit 36 is connected electrically to the coils of the armature winding 12 by an element 40 of generally cylindrical shape which is shown in detail in FIGS. 2 and 3. The element 40 is coaxial with the armature 16.

The electrical connection element 40 comprises a conducting ring 42 including a first face equipped with at least two axial spigots 44 for fastening onto the armature 16 and a second face equipped with at least two conducting axial pins 46 for connecting with the commutation circuit 36.

The conducting ring 42 also includes at least two conducting peripheral hooks 48 for connecting the coils of the armature winding with this ring.

For preference, the fastening spigots 44, the pins 46 and the connecting hooks 48 are made of the same material as the ring 42, the hooks 48 being formed by curved-over tabs from holes formed in the fastening spigots 44.

In the example described, the electrical connecting element 40 comprises twelve fastening spigots 44, the same number of hooks 48 and four connecting pins 46.

The fastening spigots 44 are embedded in holes 50 of complementary shape formed in a fastening crown 52 made of the same material as an electrical insulation cheek 24.

The connecting pins 46 are embedded in piercings 54 formed through the electronic circuit support plate 34.

The ends of the conductors forming the current entries and exits of the coils of the armature winding 12 are linked to the connecting hooks 48 by welding.

The connecting pins 46 extend into the piercings 54, through the flange 32 and the plate 34, their free ends projecting from the face of this plate opposite the armature winding 12 and being linked to conductors of the electronic circuit 36 by welding.

If necessary, the connecting pins 46 are covered with insulating sleeves preventing any electrical contact between these pins and the flange 32.

The contour of the ring 42 is interrupted in such a way as to delimit an axial gap 56 intended to interact with an axial projection 58 of complementary shape, formed on the crown 52. The gap 56 and the projection 58 form indexing means for the correct angular positioning of the spigots 44 with respect to the armature 16.

The electrical connection element 40 also includes indexing means, by irregular angular spacing of the connecting pins 46 and of the piercings 54, for the correct connection of these pins 46 with the electronic circuit 36.

The indexing means which have just been described thus make it possible to ensure correct relative positioning of the armature 16, of the electrical connecting element 40 and of the electronic circuit support plate 34.

The ring 42 includes thinned regions 60, preferably along its axial direction as represented in the figures, intended or sectioning this ring into different electrically isolated sectors.

When the armature winding 12 is manufactured, the electrical connecting element 40 is inserted into the armature 16, then the coils are wound in the slots 20 with conventional means usually used to manufacture armature windings with a collector and brushes.

After welding the ends of the conductors of the coils onto the connecting hooks 48, the ring 42 is sectioned at various places in such a way as to divide this ring into electrically isolated sectors and to produce the desired coil couplings.

It will be noted, in FIG. 1 to 3, that the ring 42 is represented in a single piece, before sectioning into different isolated sectors.

The winding of the armature winding 12 will be described below, referring to FIGS. 4 to 9.

The armature winding 12 comprises twenty-four slots 20 and the same number of teeth 21. As previously stated, the armature winding 12 is of the three-phase square type. It includes twelve coils A1 to A4, B1 to B4, C1 to C4 distributed into three phases. The coils of the same phase are supplied with electricity simultaneously. Each phase includes two pairs of diametrally opposed coils. These pairs are arranged at a right angle with respect to one another.

The coils are distributed into two, lower and upper, layers, the lower coils A1, A3, C1, C3, B2, B4 alternating with the upper coils B1, B3, A2, A4, C2, C4.

Each phase includes a pair of diametrally opposed coils arranged in the lower layer and a pair of diametrally opposed coils arranged in the upper layer.

Each coil A1 to A4, B1 to B4, C1 to C4 includes two, lower A11, B11, C11, A21, B21, C21, A31, B31, C31, A41, B41, C41 and upper A12, B12, C12, A22, B22, C22, A32, B32, C32, A42, B42, C42, windings.

The lower and upper windings of the same coil are shown diagrammatically in FIGS. 4 and 7 to 9 by a single turn.

It will be noted that the coils are wound on the armature 16 in such a way that each one surrounds three teeth 21. A coil of the upper layer is interposed between two coils of the lower layer in such a way as partially to cover these latter two coils. Hence, each coil of the lower layer surrounds one tooth which is common with the coil of the immediately adjacent upper layer.

Figure 5:
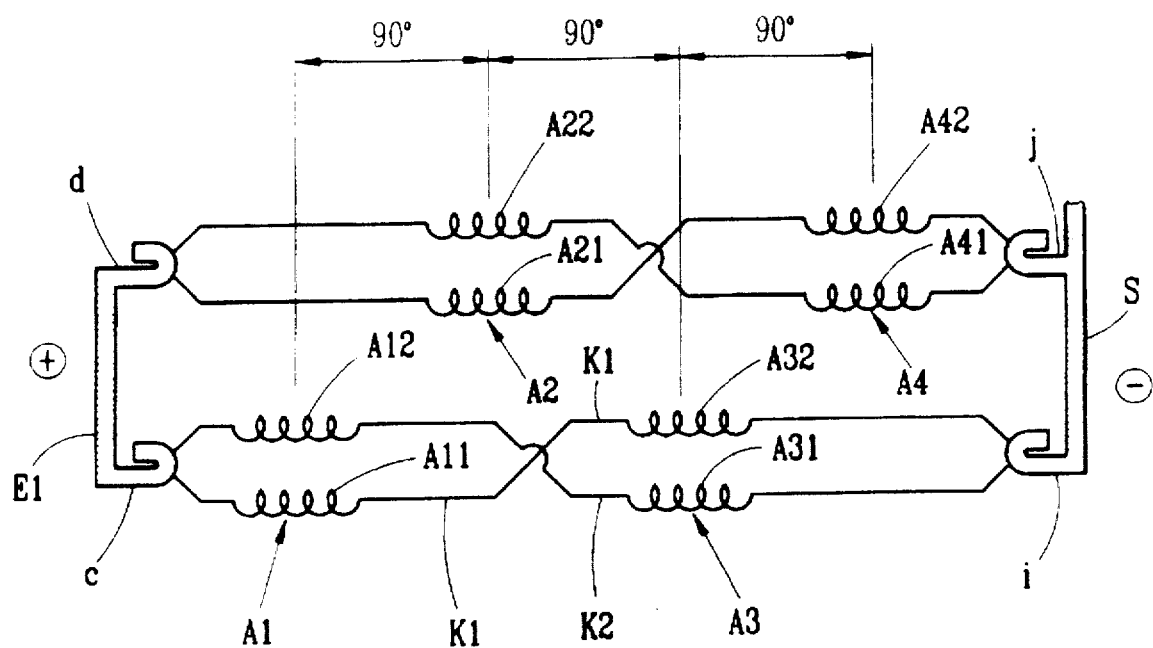
FIG. 5 is a diagram of one phase of the armature winding.

The coils of one phase have been shown diagrammatically in FIG. 5. In this figure, it is seen that each coil includes two uninterrupted wound conductors K1, K2 linked electrically in parallel. Each conductor K1, K2 forms the lower winding A11, A21, A31, A41 of one coil of a pair and the upper winding A32, A42, A12, A22 of this pair, in such a way that these lower and upper windings are linked electrically in series.

Each pair of diametrally opposed coils thus includes one coil A1, A2 for current entry into the pair, and one coil A3, A4 for current exit from the pair.

The configuration of the other phases of the armature winding is similar to the configuration of the phase represented in FIG. 5.

The two diametrally opposed coils are wound by means of a conventional two-armed winder, according to the method which will be described below by referring to FIG. 7. In this figure, only a lower pair of diametrally opposed coils A1, A3 has been represented.

In the course of a first stage, the arms simultaneously produce the two lower windings A11, A31 of the coils, by winding the two corresponding conductors K1, K2 in directions which are symmetric with respect to the diametral plane of the armature 16 perpendicular to the alignment of the coils A1, A2.

With the lower windings completed, the armature 16 is turned by one half-turn about its axis, without altering the position of the arms of the winder.

In a second stage, the arms of the winder simultaneously form the two upper windings A12, A32 of the coils by winding the two corresponding conductors K1, K2 in the same direction as in the course of the first stage.

Figure 7:
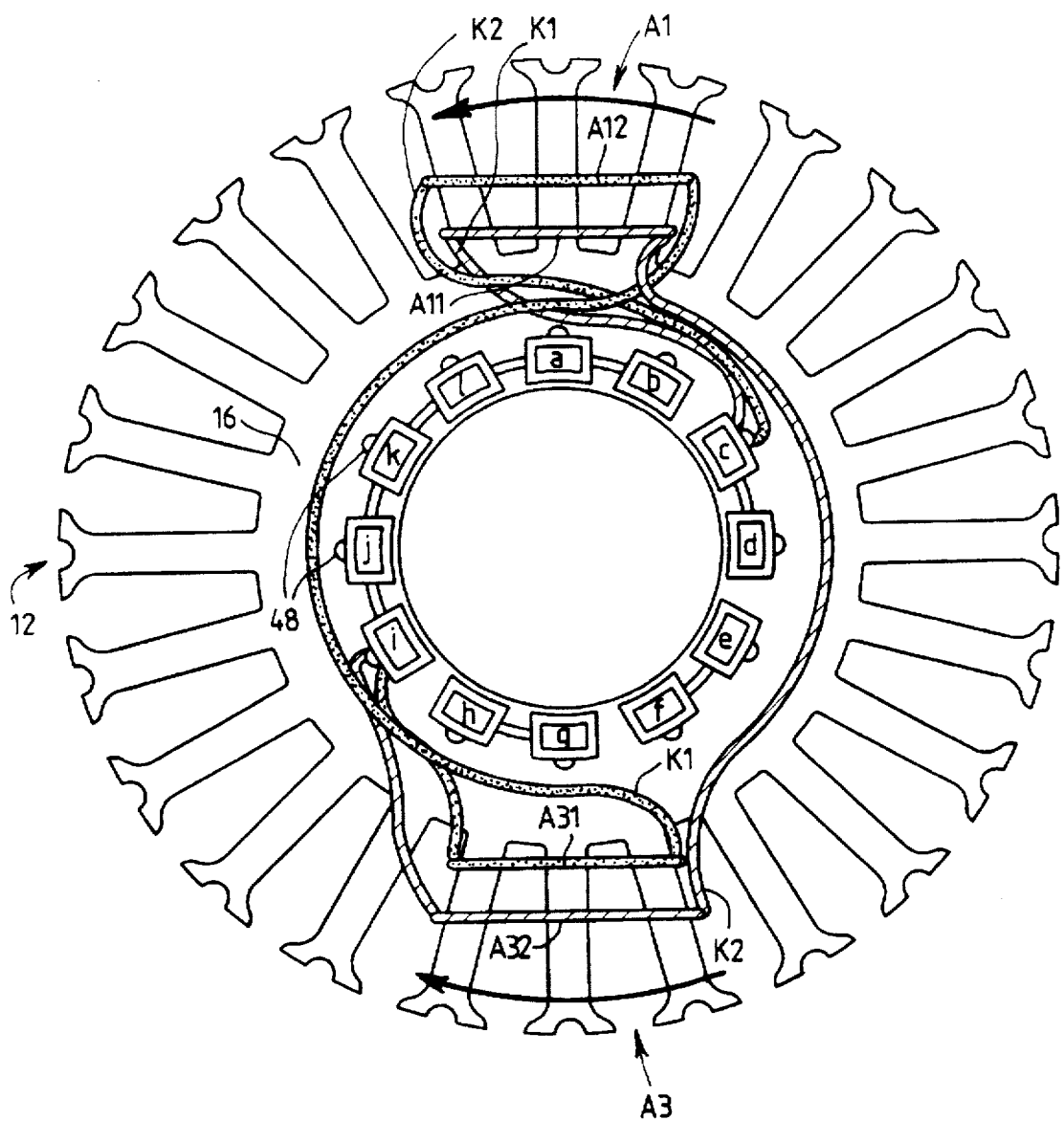
FIGS. 7 to 9 are views similar to FIG. 4 showing various stages in the winding of the armature winding.

The directions of winding of the conductors K1, K2 by the arms of the winder are indicated by arrows in FIG. 7.

The complete winding of the armature winding 12 is produced in the following way.

Figure 8:
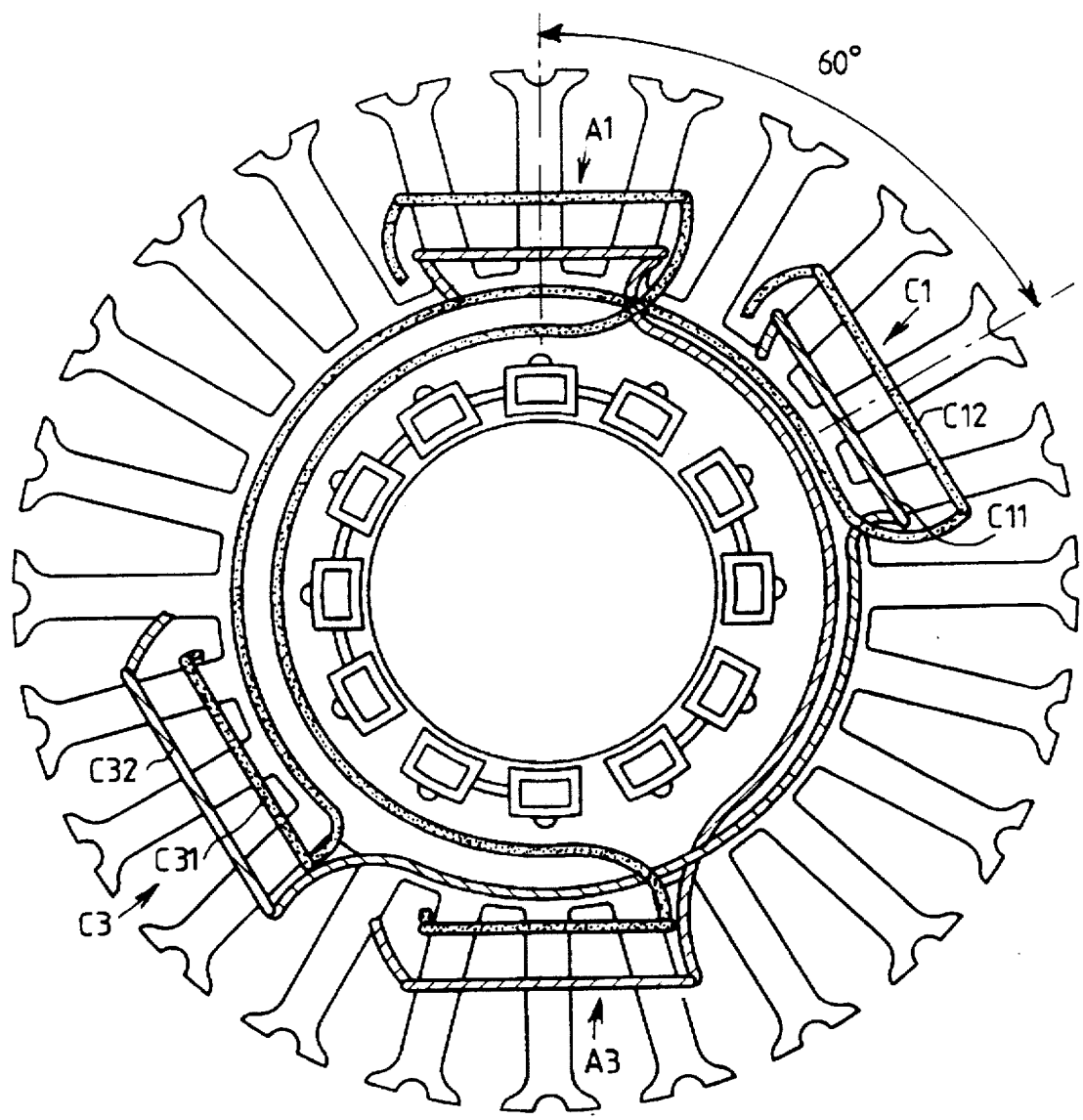
Figure 9:
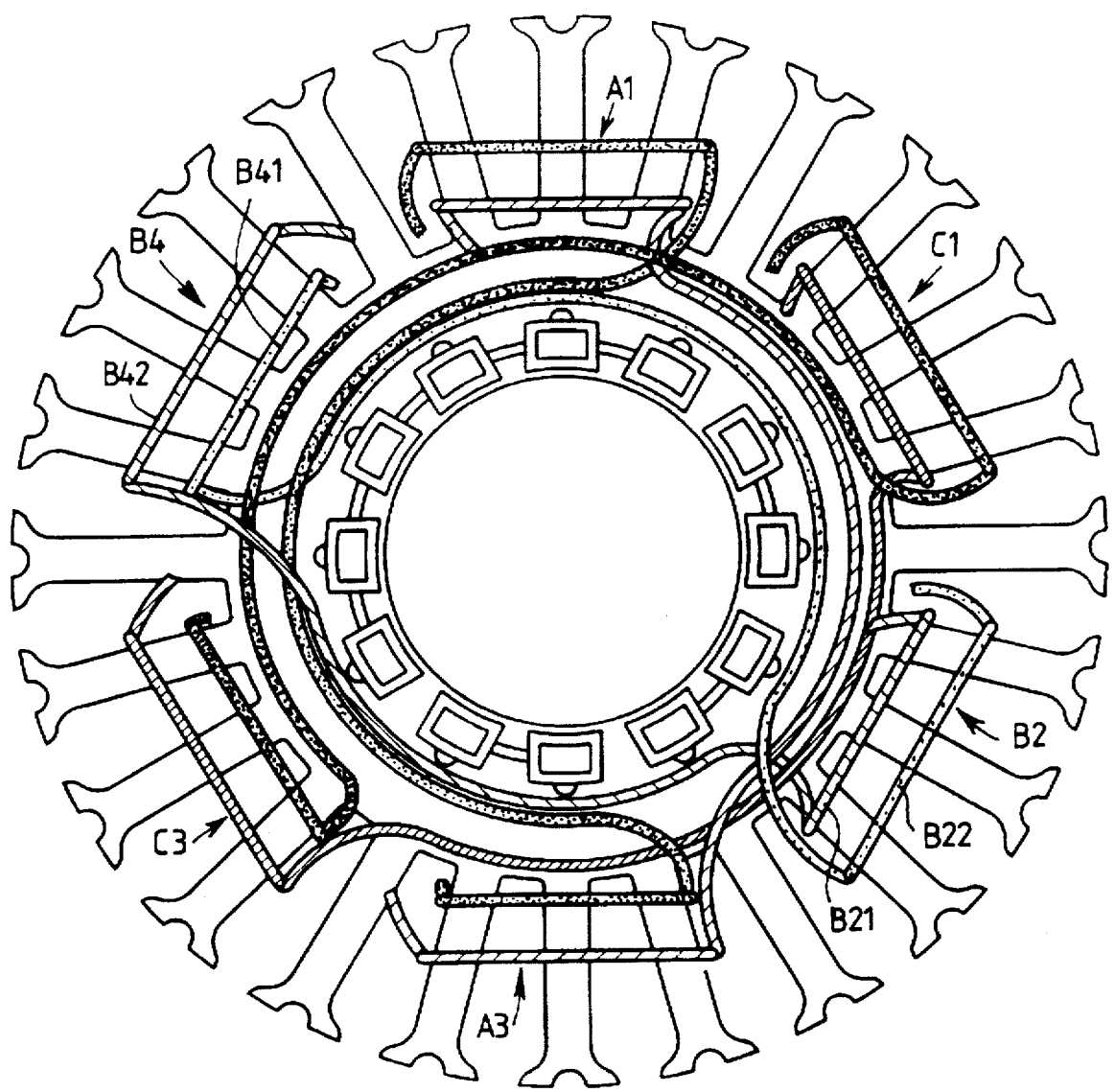

In the first place, all the coils of the lower layer are produced. To do that, the lower pair of coils of a first phase are produced, as described above and illustrated by FIG. 7, then the lower pair of coils of a second phase are produced, this pair being offset by 60° with respect to the preceding one, as illustrated in FIG. 8, and finally the lower pair of coils of the third phase are produced, as illustrated in FIG. 9.

Figure 4:
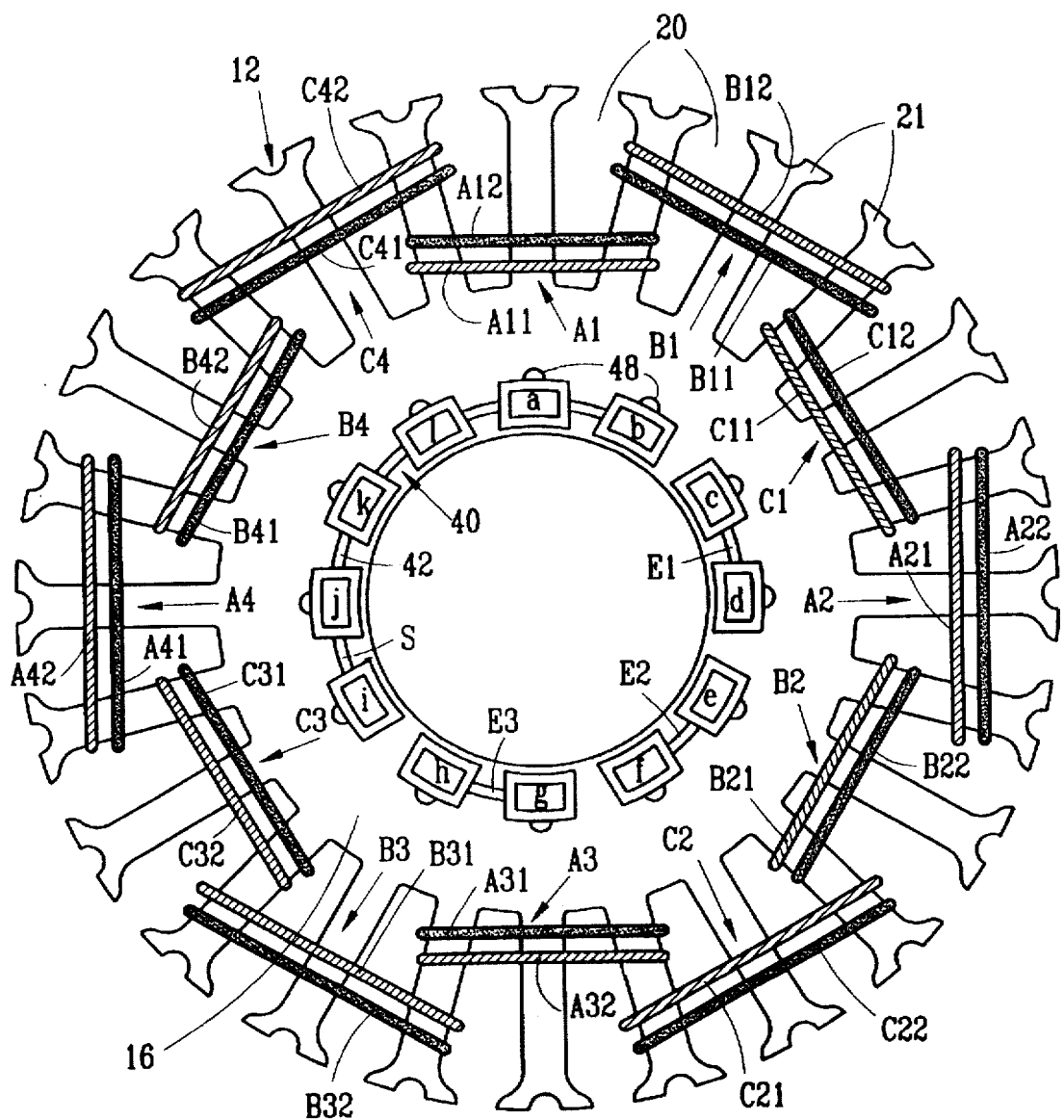
FIG. 4 is a diagrammatic front view of the armature winding of the motor according to the invention.

In the second place, the coils of the upper layer are produced, in a way similar to those of the lower layer, in such a way as to obtain the armature winding represented in FIG. 4.

All the pairs of diametrally opposed coils are produced according to the same previously described method and by means of the same two-armed winder.

The use of a two-armed winder makes it possible to produce the winding of the armature automatically and rapidly.

The motor according to the invention includes the same number of hooks 48 as armature winding coils, namely twelve. These hooks 48 are identified by alphabetical references a to 1 and are distributed in terms of angle in line with the coils of the armature winding.

It can also be seen in FIG. 4 that the ring 42 is divided into four electrically isolated sectors. The ring 42 includes one current-entry sector E1 to E3 per phase, onto which are linked the ends of the conductors K1, K2 forming the current entries of the two pairs of coils of this phase, and an exit sector S, onto which are linked all the ends of the conductors K1, K2 forming the current exits of all the pairs of coils. Hence, the two pairs of coils of the same phase are linked electrically in parallel.

It will be noted that the ring 42 includes the same number of connecting pins 44 as sectors E1 to E3, S.

Figure 6:
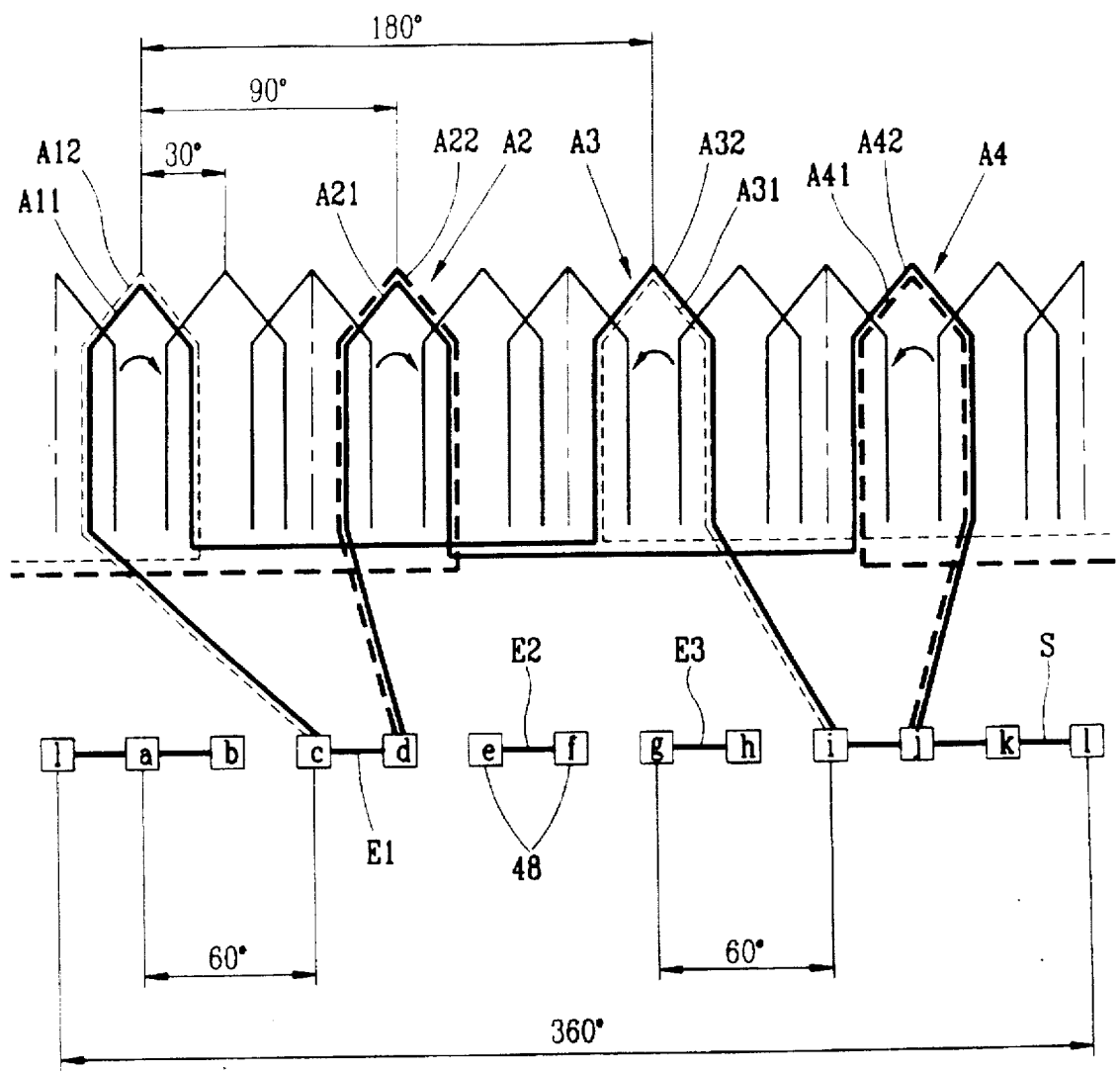
FIG. 6 is a developed diagram of the coils of the armature winding.

Referring now to FIG. 6, the electrical connection of the coils of one phase to the hooks 48 is clearly illustrated.

In this figure, it is seen that the current entry of the lower pair (belonging to the lower layer) of coils A1, A3 of one phase is linked to a current entry hook c offset by 60°, in the clockwise direction, with respect to the current entry coil A1 of this pair. Likewise, the current exit of the lower pair of coils A1, A3 of a phase is linked to a current exit hook i offset by 60°, in the clockwise direction, with respect to the current exit coil A3 of that pair.

In contrast, the current entry of the upper pair (belonging to the upper layer) of coils A2, A4 of one phase is linked to a current entry hook d arranged in line with the current entry coil A2 of this pair. Likewise, the current exit of the upper pair of coils A2, A4 of one phase is linked to a currant exit hook j arranged in line with the current exit coil A4 of that pair.

Hence it is arranged, on the one hand, that the two current entry hooks which are linked to the two pairs of coils of the same phase are juxtaposed and belong to the same current entry sector E1 to E3, and, on the other hand, that all the current exit hooks are juxtaposed and belong to the same current exit sector S.

It will be noted that, for reasons of clarity, the connections of all the coils of the armature winding are not represented in FIG. 6. In FIG. 5, the current entry hooks c, d of one phase, corresponding to a positive polarization of the current (+), and the current exit hooks i, j of this phase, corresponding to a negative polarization of the current (−), have been represented.

The invention includes numerous advantages.

In particular, the electrical connecting element according to the invention makes it possible to produce the armature winding with a conventional winder ususally used for manufacturing armature windings of direct-current motors with a collector and brushes.

The ends of the wires of the coils of the armature winding can be easily welded to the connecting hooks 48 using automatic facilities. Likewise, the electrical connection of the electronic circuit 36 with connecting pins 46 is easy to carry out with automatic facilities. Hence, the whole of the armamture winding 12 can be manufactured by automatic techniques.

The electrical connecting element 40 according to the invention makes it possible to couple the coils of the armature winding in any desired configuration, which makes it possible to simplify the electronic circuit 36 by dispensing, in the latter, with the conventional means for coupling the coils.

The indexing means of the electrical connecting element make it possible to avoid the errors in electrical connection between the coils of the armature winding and the electronic commutation circuit.

What is claimed is:

1. An electrical connecting element for an electric motor, said motor comprising an armature winding (12), equipped with an armature (16) carrying conducting coils, and an electronic circuit (36) for providing electrical power to, and commutation of, the coils, said connecting element comprising:

a conducting ring (42) including a first face, having at least two axial spigots (44) for mechanically connecting the ring to the armature, and a second face having at least two conducting axial pins (46) for electrically connecting the ring to the electronic circuit; and at least two conducting peripheral hooks (48) for electrically connecting the coils to the ring (42), the spigots (44), the pins (46) and the hooks (48) being integral with the ring (42) and forming a single piece therewith, and the conducting ring (42) being sectionable into electrically isolated sectors.

2. The electrical connecting element according to claim 1, wherein the hooks (48) are formed by curved-over tabs from holes formed in the spigots (44).

3. The electrical connecting element according to claim 1, further comprising first indexing means, with an axial gap (56) and an axial projection (58) which are complementary, for correctly angularly positioning the spigots (44) with respect to the armature (16), at least one of said axial gap (56) and said projection (58) being on the ring (42).

4. The electrical connecting element according to claim 1, comprising second indexing means, defined by irregular angular spacing of the pins (46), for correctly connecting said pins to the electronic circuit (36).

5. The electrical connecting element according to claim 1, wherein the ring (42) includes thinned regions (60) for sectioning the ring.

6. An electrical connecting element for an electric motor, said motor comprising an armature winding (12), with an armature (16) carrying conducting coils, and an electronic circuit (36) for providing electrical power to, and commutation of, the coils, said connecting element comprising:

a conducting ring (42) including a first face with at least two axial spigots (44) for mechanically connecting the ring to the armature, and a second face with at least two conducting axial pins (46) for electrically connecting the ring to the electronic circuit;

at least two conducting peripheral hooks (48) for electrically connecting the coils to the ring (42);

first indexing means for correctly angularly positioning the spigots (44) with respect to the armature (16); and second indexing means for correctly connecting the pins (46) to the electronic circuit, the spigots (44), the pins (46), the hooks (48) and the first and second indexing means being integral with the ring (42) and forming a single piece therewith, the conducting ring (42) being sectionable into electrically isolated sectors.

7. The electrical connecting element according to claim 6, wherein the first indexing means comprises an axial gap (56) and an axial projection (58) which are complementary, at least one of said axial gap (56) and projection (58) being on the ring (42).

8. The electrical connecting element according to claim 6, wherein the second indexing means is defined by an irregular angular spacing of the pins (46).

9. An electric motor comprising:

a fixed armature winding (12) equipped with an armature (16) of generally cylindrical shape carrying conducting coils;

a support bracket (34) carrying an electronic circuit (36) for providing power to, and commutation of, the coils; and an electrical connecting element (40) of generally cylindrical shape, coaxial with the armature (16) and comprising a conducting ring (42) having a first face with at least two axial spigots (44) which are adapted to mechanically connect the ring to the armature (16) and which are pluggable into complementary holes (50) formed in said armature, having a second face with at least two axial conducting pins (46) which electrically connect the ring to the electronic circuit (36) and which are pluggable into piercings (54) formed through the support bracket (34) of the circuit, and having at least two conducting peripheral hooks (48) for electrically connecting the coils to the ring (42), the spigots (44), the pins (46) and the hooks (48) being integral with the ring (42) and forming a single piece therewith, the ring being sectioned into electrically isolated sectors.

10. The electric motor according to claim 9, wherein the hooks (48) are formed by curved-over tabs of holes formed in the spigots (44).

11. The electric motor according to claim 9, wherein the holes (50) for fastening the spigots (44) are formed in an electrical insulation cheek (24) covering a face of the armature (16).

12. The electric motor according to claim 11, comprising first indexing means, with an axial gap (56) and an axial projection (58) which are complementary, for correctly angularly positioning the spigots (44) with respect to the armature (16), the axial gap (56) and projection (58) being formed in the ring (42) and the insulation cheek (24).

13. The electric motor according to claim 12, comprising second indexing means, defined by irregular angular spacing of the connecting pins (46), for correctly connecting the pins (46) to the electronic circuit (36).

14. The electric motor according to claim 10, wherein the holes (50) for fastening the spigots (44) are formed in an electrical insulation cheek (24) covering a face of the armature (16).

15. The electric motor according to claim 14, comprising first indexing means, with an axial gap (56) and an axial projection (58) which are complementary, for correctly angularly positioning the spigots (44) with respect to the armature (16), the axial gap (56) and projection (58) being formed in the ring (42) and the insulation cheek (24).

16. The electric motor according to claim 15, comprising second indexing means, defined by irregular angular spacing of the connecting pins (46), for correctly connecting the pins (46) to the electronic circuit (36).

* * * * *